United States Patent
Hu et al.

(10) Patent No.: US 10,745,278 B2
(45) Date of Patent: Aug. 18, 2020

(54) METHOD FOR PRODUCING PHOSPHORIC ACID AND BY-PRODUCING ALPHA-HEMIHYDRATE GYPSUM BY WET-PROCESS

(71) Applicants: KINGENTA ECOLOGICAL ENGINEERING GROUP CO., LTD., Shandong (CN); KINGENTA NORSTERRA CHEMICAL CO., LTD., Guizhou (CN)

(72) Inventors: Zhaoping Hu, Shandong (CN); Hongkun Chen, Shandong (CN); Hualong Yao, Shandong (CN); Yongxiu Liu, Shandong (CN); Chengzhi Li, Shandong (CN); Xixing Zhang, Shandong (CN)

(73) Assignees: Kingenta Ecological Engineering Group Co., Ltd., Shandong (CN); Kingenta Norsterra Chemical Co., Ltd., Guizhou (CN)

(*) Notice: Subject to any disclaimer, the term of this patent is extended or adjusted under 35 U.S.C. 154(b) by 48 days.

(21) Appl. No.: 15/760,851

(22) PCT Filed: Aug. 26, 2016

(86) PCT No.: PCT/CN2016/096941
§ 371 (c)(1),
(2) Date: Mar. 16, 2018

(87) PCT Pub. No.: WO2017/045520
PCT Pub. Date: Mar. 23, 2017

(65) Prior Publication Data
US 2018/0257938 A1  Sep. 13, 2018

(30) Foreign Application Priority Data
Sep. 18, 2015 (CN) .......................... 2015 1 0595367

(51) Int. Cl.
*C01B 25/229* (2006.01)
*C01F 11/46* (2006.01)
*C01B 25/22* (2006.01)

(52) U.S. Cl.
CPC ...... *C01B 25/2295* (2013.01); *C01B 25/2204* (2013.01); *C01F 11/46* (2013.01); *C01F 11/466* (2013.01)

(58) Field of Classification Search
None
See application file for complete search history.

(56) References Cited

U.S. PATENT DOCUMENTS

| 3,653,826 A | * | 4/1972 | Ishihara | ................. C01B 25/22 423/320 |
| 3,935,298 A |   | 1/1976 | Sugahara et al. | |

(Continued)

FOREIGN PATENT DOCUMENTS

| CN | 1247158 A | 3/2000 |
| CN | 1421385 A | 6/2003 |

(Continued)

OTHER PUBLICATIONS

Extended European Search Report for European Application No. 16 845 634.1, dated Feb. 22, 2019, 7 pages.

(Continued)

*Primary Examiner* — Melissa S Swain
(74) *Attorney, Agent, or Firm* — RatnerPrestia

(57) ABSTRACT

Provided is a method for producing phosphoric acid and at the same time obtaining alpha-hemihydrate gypsum including: adding a phosphate rock powder and a part of dilute sulfuric acid into an extraction tank, carrying out an extraction reaction on same, separating a clear liquid from the obtained mixed slurry, sending the clear liquid, as a finished product phosphoric acid, into an acid storeroom, and trans- (Continued)

ferring a separated solid, together with the rest mixed slurry, into a crystal transformation tank; and adding sulfuric acid and a crystal transformation agent into the crystal transformation tank, carrying out a crystal transformation reaction for 1.5-7.5 h at 60° C.-130° C., and solid-liquid separating the obtained mixed acid slurry, wherein the solid can be dried into a gypsum powder, or may be not subjected to a drying step and made into gypsum products such as gypsum boards, gypsum building blocks and gypsum members by directly adding water.

20 Claims, 1 Drawing Sheet

(56) References Cited

U.S. PATENT DOCUMENTS

| | | | |
|---|---|---|---|
| 4,196,172 | A | 4/1980 | Ore et al. |
| 4,501,724 | A | 2/1985 | Goers |
| 4,777,027 | A | 10/1988 | Davister et al. |
| 4,797,265 | A | 1/1989 | Inoue et al. |
| 2004/0047790 | A1 | 3/2004 | Feng et al. |
| 2007/0048549 | A1 | 3/2007 | Song et al. |

FOREIGN PATENT DOCUMENTS

| | | | |
|---|---|---|---|
| CN | 1584130 | A | 2/2005 |
| CN | 1789116 | A | 6/2006 |
| CN | 102001636 | A | 4/2011 |
| CN | 102126737 | A | 7/2011 |
| CN | 102303852 | A | 1/2012 |
| CN | 103086335 | A | 5/2013 |
| CN | 103332664 | A | 10/2013 |
| CN | 103626143 | A | 3/2014 |
| CN | 104211105 | A | 12/2014 |
| CN | 104355560 | A | 2/2015 |
| CN | 104628274 | A | 5/2015 |
| KZ | 26378 | A4 | 11/2012 |

OTHER PUBLICATIONS

Canadian Office Action for Canadian Application No. 2,998,908, dated Mar. 11, 2019, 5 pages.
Ru et al., "Research progress of a-hemihydrate gypsum prepared by phosphogypsum," Nov. 2011, pp. 15-18, New Building Materials (abstract only).
Chinese Office Action for Chinese Application No. 201510595122.4, dated Nov. 4, 2016, with English translation, 9 pages.
International Search Report issued in PCT/CN2016/096941 dated Nov. 30, 2016, 4 pages.
Supplementary European Search Report issued in EP 16 84 5633 dated Feb. 22, 2019, 7 pages.
Russian Office Action for Russian Application No. 2018113281/05, dated Dec. 19, 2018, with translation, 11 pages.
Russian Office Action for Russian Application No. 2018113282/05, dated Dec. 27, 2018 with translation, 14 pages.
USPTO Non-Final Office Action issued in U.S. Appl. No. 15/760,822, dated Feb. 10, 2020, 27 pages.
USPTO Notice of Allowance issued in U.S. Appl. No. 15/760,822, dated May 4, 2020, 9 pages.

* cited by examiner

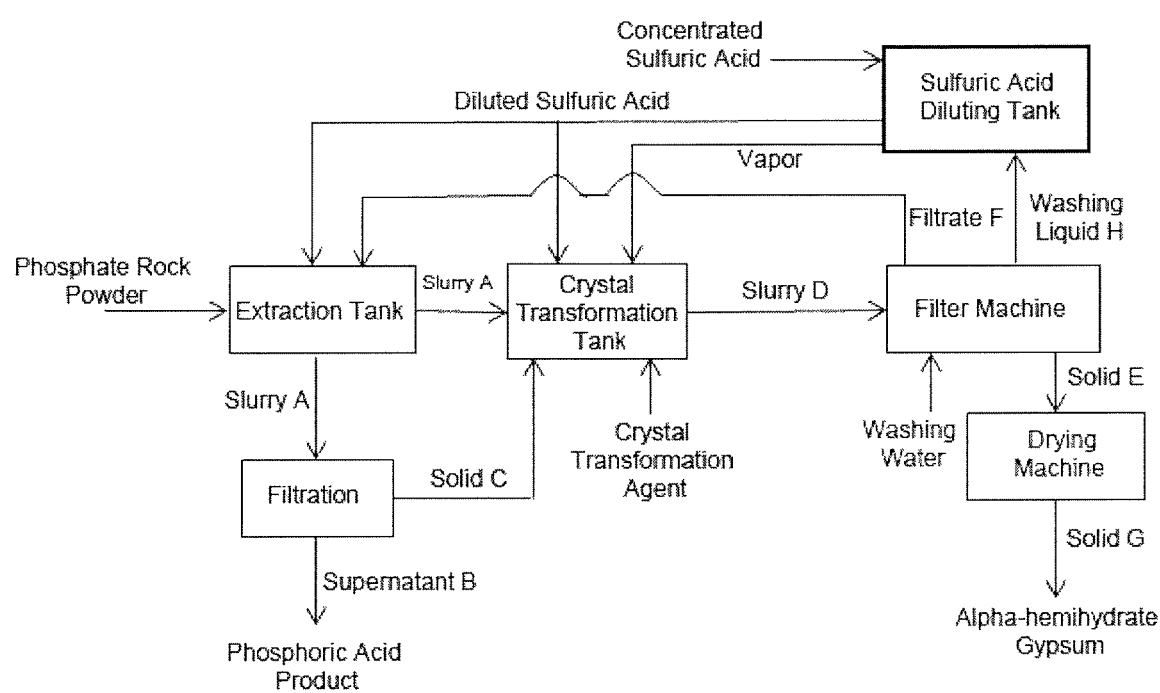

METHOD FOR PRODUCING PHOSPHORIC ACID AND BY-PRODUCING ALPHA-HEMIHYDRATE GYPSUM BY WET-PROCESS

This application is the U.S. National Phase Application of PCT/CN2016/096941, filed Aug. 26, 2016, which claims priority to Chinese Patent Application No. 201510595367.7, filed Sep. 18, 2015, the disclosures of which are hereby incorporated by reference in their entirety.

FIELD

The present invention belongs to the technical field of a method for producing wet-process phosphoric acid, in particular, relates to a method for producing wet-process phosphoric acid and at the same time obtaining alpha-hemihydrate gypsum as by-product.

BACKGROUND

In general, a so-called "wet-process phosphoric acid" actually refers to wet-process phosphoric acid produced by a sulfuric acid process, that is, phosphoric acid is produced by decomposing a phosphate rock with sulfuric acid. In China, 80% or more of phosphoric acid is produced by a dihydrate process for wet-process phosphoric acid. The dihydrate process is characterized in that the process is simple, the technique is mature and the adaptability to rock types is high, which is especially suitable for low and medium grade rocks and dominates in the wet-process phosphoric acid production. However, there are still some insurmountable deficiencies in the dihydrate process. The application of by-product phosphogypsum is subjected to many limitations due to its high phosphorus content, of which only a small part is used to produce low-grade and low-quality gypsum building materials and cement retarders. Most of phosphogypsum is discarded or stockpiled, causing serious pollution and waste. Therefore, it is necessary to further improve the conventional wet-process phosphoric acid production so as to reduce the phosphorous content in phosphogypsum, thereby converting it into a product with high use value.

Chinese Patent (Publication No. CN103626143A) discloses a method for producing phosphoric acid and by-producing white gypsum by a wet process. Firstly, phosphate rock powder (pulp) reacts with phosphoric acid at 45 to 70° C. under stirring to generate a mixed pulp containing solid impurities. The mixed pulp is subjected to continuous or discontinuous precipitation and separation to give a mixed solution of phosphoric acid and calcium phosphate, as well as a thick pulp containing solid impurities. Under condition of stirring, sulfuric acid is added to the mixed solution of phosphoric acid and calcium phosphate and reaction undergoes. The resulting mixture is precipitated, layered and separated into phosphoric acid and white gypsum. By this method, phosphoric acid and white gypsum are obtained without the generation of phosphogypsum, eliminating the pollution from the piled phosphogypsum to air, soil and underground water. In addition, the by-product dihydrate white gypsum has high purity and high whiteness value. However, there are still acid-insoluble residues generated by this method, which is difficult to deal with. In addition, the dihydrate white gypsum needs to be subjected to dehydrate process or crystal modification process to obtain beta-gypsum or alpha-gypsum products with high added value.

Chinese patent (Publication No. CN102001636A) discloses a method for preparing phosphoric acid with a wide-range concentration and clean gypsum through wet-process from low or medium grade phosphate rock. The method provides a new method for preparing wet-process phosphoric acid-hemi-dihydrate method, of which the by-product is high quality construction hemihydrate gypsum or functional dihydrate gypsum, making full use of low or medium grade phosphate rock. However, the method still discharges solid residues and dihydrate gypsum at a similar amount of the clean gypsum, which is hard to be used.

Chinese Patent (Publication No. CN1421385) discloses a method for preparing hemihydrate-dihydrate phosphoric acid. In the method, the precipitation ratio of calcium in reaction tank is controlled and sulfuric acid is added at two steps. One part of sulfuric acid is added to acid-mixing tank, mixed with diluted phosphoric acid and then added to the second reaction tank; the other part of sulfuric acid is added to diluted phosphoric acid tank. Alpha-hemihydrate gypsum is prepared firstly and then transformed to dihydrate gypsum. By-product of the method is still dihydrate gypsum, which is hard to be used directly. Chinese Patent (Publication No. CN103086335A) discloses a dihydrate-hemihydrate method for producing wet-process phosphoric acid and coproducing by-product alpha-hemihydrate gypsum. $\omega(P_2O_5)$ concentration of the wet-process phosphoric acid produced by dihydrate-process is from 35% to 39%, and $\omega(P_2O_5)$ concentration of the wet-process phosphoric acid produced by hemihydrate-process is from 10% to 15% used as an acid supplemental production of dihydrate process. The by-product, hemihydrate phosphogypsum, contains 5% to 7% crystal water, in which the mass percentage of free $P_2O_5$ is less than 0.4%, and the crystal form of which is alpha-hemihydrate phosphogypsum. In the method, the condition for dihydrate-hemihydrate crystal transformation is not strictly controlled, and no crystal transformation agent is used to control the aspect ratio of alpha-hemihydrate gypsum. Although alpha-hemihydrate gypsum product is produced, the strength of alpha-hemihydrate gypsum product is low, so the use of the product is limited. In addition, phosphorus content of the product is still relative high.

In summary, the problems in the prior art are: 1) wastes such as acid insoluble substances still need to be discharged; 2) the coproduced gypsum is a dihydrate, which needs subsequent process to become products with a high added value, such as alpha-hemihydrate gypsum, beta-hemihydrate gypsum, etc.; 3) the resulting alpha-hemihydrate gypsum product has low strength and high phosphorus content, limiting its high-end applications.

SUMMARY

The present disclosure aims to overcome the deficiencies of the prior art by providing a method for producing wet-process phosphoric acid and at the same time obtaining alpha-hemihydrate gypsum as by-product. Based on the traditional wet-process phosphoric acid production, the method can eliminate the discharge of phosphogypsum and acid insoluble substances, reduce the phosphorus content in gypsum, increase the availability of phosphorus, and produce an alpha-hemihydrate gypsum product which can be directly applied to the building materials industry, through technological innovations.

The present disclosure provides the following technical solutions.

A method for producing wet-process phosphoric acid and at the same time obtaining alpha-hemihydrate gypsum as by-product, comprising the following steps:

S1) mixing phosphate rock powder with diluted sulfuric acid and performing an extraction reaction to obtain a mixed slurry A;

S2) taking a fraction of 0 to ⅔ volume of the mixed slurry A obtained in step S1) and performing a solid and liquid separation to obtain a supernatant B and a solid C;

S3) mixing the solid C and the rest mixed slurry with diluted sulfuric acid; adding a crystal transformation agent; performing a crystal transformation reaction under heating to obtain a mixed slurry D;

S4) filtering the mixed slurry D obtained in step S3) to obtain an alpha-hemihydrate gypsum.

Preferably, in step S1), the solid-liquid mass ratio of the phosphate rock powder and the diluted sulfuric acid is from 1:2 to 1:10.

Preferably, in step S1), the temperature of the extraction reaction is from 30 to 95° C. and the duration of the extraction reaction is from 15 to 60 minutes.

Preferably, the crystal transformation agent is one selected from water-soluble phosphate, water-soluble sulfate, water-soluble nitrate, water-soluble citrate, water-soluble alkylbenzenesulfonate, water-soluble alkyl fatty acid salt and water-soluble organic carboxylate, or a combination thereof; the water-soluble phosphate, water-soluble sulfate, water-soluble nitrate, water-soluble citrate, water-soluble alkylbenzenesulfonate, water-soluble alkyl fatty acid salt and water-soluble organic carboxylate each independently contain one or more ions of $Al^{3+}$, $Fe^{3+}$, $Mg^{2+}$, $K^+$, $Na^+$ and $NH_4^+$.

Preferably, in step S3), the temperature of the crystal transformation reaction is from 60 to 130° C. and the duration of the crystal transformation reaction is from 1.5 to 7.5 hours.

Preferably, in step S3), the solid-liquid mass ratio of the mixture which is obtained by mixing solid C and the rest mixed slurry with the diluted sulfuric acid is from 2:1 to 6:1.

Preferably, in step S3), in the liquid phase resulting from mixing the solid C and the rest mixed slurry with diluted sulfuric acid, the mass fraction of phosphoric acid in terms of $P_2O_5$ is from 16% to 25%, and the mass fraction of sulfuric acid in terms of $H_2SO_4$ is from 8% to 12%.

Preferably, a method for producing wet-process phosphoric acid and at the same time obtaining alpha-hemihydrate gypsum as by-product, comprises the following steps:

(1) adding phosphate rock powder and diluted sulfuric acid in a solid-liquid mass ratio of 1:2 to 1:10 into an extraction tank; performing extraction reaction for 15 to 60 minutes under controlling the temperature of the extraction tank at 30 to 95° C. to obtain a mixed slurry A;

(2) taking a fraction of 0 to ⅔ volume of the mixed slurry A obtained in step S1) and performing a solid and liquid separation to obtain a supernatant B and a solid C; transferring the supernatant B to an acid storage as final phosphoric acid and transferring the solid C to a crystal transformation tank together with the rest mixed slurry;

(3) adding diluted sulfuric acid to the crystal transformation tank; controlling the liquid-solid ratio as well as the content of $P_2O_5$ and $H_2SO_4$ in the liquid phase of phosphoric acid after decalcification to obtain a mixed slurry; adding a crystal transformation agent and performing a crystal transformation reaction for 1.5 to 7.5 hours to obtain a mixed acid slurry D, wherein the temperature of the crystal transformation tank is maintained at 60 to 130° C.;

(4) separating solid and liquid in the mixed acid slurry D obtained in step (3) to obtain a solid E and a filtrate F; washing the solid E with hot water to obtain a washing liquid H and a solid G; and drying the solid G to obtain an alpha-hemihydrate gypsum;

(5) introducing the filtrate F in step (4) into the extraction tank of step (1) to continue the extraction of phosphate rock powder; introducing the washing liquid H into a sulfuric acid diluting tank to dilute concentrated sulfuric acid, which is used for the extraction process of step (1) and the crystal transformation reaction of step (3).

In the present disclosure, the whole system becomes a circulation system through step (2). The phosphoric acid generated in the step (1) is excessive in the subsequent crystal transformation process, and through step (2), not only a part of product phosphoric acid is obtained, but also a smooth phosphorus cycle in the whole system is ensured.

According to the present disclosure, it is preferred that the fineness of the phosphate rock powder in step (1) is from 80 to 100 meshes and the phosphorus pentoxide content in the phosphate rock powder is from 10 to 40% by mass fraction.

According to the present disclosure, it is preferred that the mass concentration of diluted sulfuric acid in steps (1) and (3) is from 20 to 40%, more preferably from 20 to 35%.

According to the present disclosure, it is preferred that the mass fraction of sulfate ions in the mixed slurry A in step (1) is less than 1%.

According to the present disclosure, it is preferred that in step (3), the liquid-solid mass ratio of the mixed acid solution after decalcification and the rest slurry is from 2:1 to 6:1, that is, the liquid-solid mass ratio of mixtures of the solid C, the rest mixed slurry and the added diluted sulfuric acid is from 2:1 to 6:1; wherein the liquid phosphoric acid in terms of $P_2O_5$ accounts for 16% to 25% by mass fraction of the mixed acid, and the sulfuric acid in terms of $H_2SO_4$ accounts for 8% to 12% by mass fraction of the mixed acid. More preferably, in step (3), the liquid-solid mass ratio of the mixed acid solution after decalcification and the rest slurry is from 3:1 to 5:1, wherein the liquid phosphoric acid in terms of $P_2O_5$ accounts for 18% to 23% by mass fraction of the mixed acid, and the sulfuric acid in terms of $H_2SO_4$ accounts for 9% to 10% by mass fraction of the mixed acid.

According to the present disclosure, it is preferred that the crystal transformation agent in step (3) is one selected from a water-soluble phosphate, water-soluble sulfate, water-soluble nitrate, water-soluble citrate, water-soluble alkylbenzenesulfonate, water-soluble alkyl fatty acid salt and water-soluble organic carboxylate, or a combination thereof, which contains $Al^{3+}$, $Fe^{3+}$, $Mg^{2+}$, $K^+$, $Na^+$, $NH_4^+$ ions.

More preferably, the crystal transformation agent added in step (3) is a combination of sodium citrate, ferric sulfate and sodium lignosulfonate; or a combination of sodium nitrate, magnesium sulfate and sodium dodecyl sulfonate; or a combination of sodium phosphate, aluminum sulfate and sodium lignosulfonate; or a combination of ammonium nitrate, magnesium sulfate and sodium chloride.

Even more preferably, the combination of the crystal transformation agent is one of the following combinations by mass ratio:

a. sodium citrate:ferric sulfate:sodium lignosulfonate=1.00:1.50~2.00:0.30~0.90;

b. sodium nitrate:magnesium sulfate:sodium dodecyl sulfonate=1.00:1.50~2.00:0.30~0.90;

c. sodium phosphate:aluminum sulfate:sodium lignosulfonate=1.00:1.50~2.00:0.40~0.90;

d. ammonium nitrate:magnesium sulfate:sodium chloride=1.00:1.60~2.20:0.50~0.80.

According to the present disclosure, it is preferred that the total amount of the crystal transformation agent added in step (3) is from 0.1% to 1.0% by mass of the mixed slurry.

According to the present disclosure, it is preferred that the temperature of the hot water in step (4) is from 80 to 90° C.

According to the present disclosure, it is preferred that the drying temperature in step (4) is from 110 to 180° C., more preferably from 110 to 130° C.

According to the present disclosure, it is preferred that vapor generated in the dilution process in step (5) is introduced into the crystal transformation tank in step (3) to provide heat for reaction.

Even more preferably, a method for producing wet-process phosphoric acid and at the same time obtaining alpha-hemihydrate gypsum as by-product, comprises the following steps:

(1) adding phosphate rock powder and diluted sulfuric acid with a mass concentration of 20% into an extraction tank according to a solid-liquid mass ratio of 1:4, wherein the fineness of the phosphate rock powder is 100-mesh and the phosphorus pentoxide content in the phosphate rock is 32%; performing an extraction reaction for 30 minutes wherein controlling the temperature of the extraction tank at 80° C. under stirring to obtain a mixed slurry A;

(2) taking a fraction of ⅙ volume of the mixed slurry A obtained in step S1) and performing a solid and liquid separation to obtain a supernatant B and a solid C; transferring the supernatant B to an acid storage as final phosphoric acid and transferring the solid C to a crystal transformation tank together with the rest mixed slurry;

(3) adding diluted sulfuric acid with a mass concentration of 20% to the crystal transformation tank; controlling the liquid-solid mass ratio of mixed acid solution after decalcification and slag slurry at 6:1 to obtain a mixed slurry, wherein the liquid phosphoric acid in terms of $P_2O_5$ is 20% by mass fraction of the mixed acid and the sulfuric acid in terms of $H_2SO_4$ is 9% by mass fraction of the mixed acid; after obtaining the mixed slurry, adding crystal transformation agents: iron sulfate accounted for 0.23% of the mass of the mixed slurry, sodium citrate accounted for 0.12% of the mass of the mixed slurry, and sodium lignosulfonate accounted for 0.08% of the mass of the mixed slurry; performing crystal transformation reaction for 3 h while maintaining the temperature of crystal transformation tank at 110° C. to obtain a mixed acid slurry D;

(4) separating solid and liquid in the mixed acid slurry D obtained in step (3) to obtain a solid E and a filtrate F; washing the solid E with 85° C. hot water to obtain a washing liquid H and a solid G; and drying the solid G by a blow-dryer at a drying temperature of 110° C. to obtain an alpha-hemihydrate gypsum;

(5) introducing the filtrate F in step (4) into the extraction tank of step (1) to continue the extraction of phosphate rock powder; introducing the washing liquid H into a sulfuric acid diluting tank to dilute concentrated sulfuric acid, which is used for the extraction process of step (1) and the crystal transformation process of step (3); introducing vapor generated during the dilution process into the crystal transformation tank to provide heat for reaction.

The principle of the present disclosure is that phosphate rock powder is decomposed by a mixed acid of sulfuric acid and phosphoric acid to transform all the calcium ions in the phosphate rock to dihydrate gypsum, followed by adding a crystal transformation agent and controlling the conditions in the mixed acid solution of sulfuric acid and phosphoric acid to directly produce alpha-hemihydrate gypsum.

The present disclosure involves the chemical reaction formulas as follows:

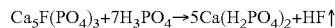

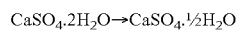

The crystal transformation conditions in the present disclosure is that, in a mixed acid solution of phosphoric acid and sulfuric acid, under a certain temperature and crystal transformation agent, the dihydrate gypsum is dissolved in the strong acid environment and water molecules are discharged during the recombination process; new crystal nuclei is formed, small crystal nuclei dissolves and large crystal nuclei grows, which is a common characteristic of the same kind of crystal. Under the strong acid condition, the crystal transformation agent compounded in the present disclosure can promote the crystalline morphology of gypsum to grow toward the desired hexagonal short cylindrical shape. The resulting crystalline morphology would not change even being washed by a solvent such as ethanol or water, and can maintain the original morphology in water for a long time, which has completely the same characteristics as alpha-hemihydrate gypsum generated by hydrothermal method.

The alpha-hemihydrate gypsum of the present disclosure can be dried and ground into gypsum powder, or can be directly added with water without drying to produce gypsum products such as gypsum boards, gypsum building blocks and gypsum members.

In the present disclosure, the washing liquid is used to dilute the concentrated sulfuric acid, whereby on one hand, the recycling of the washing liquid avoids the generation of liquid wastes; on the other hand, the vapor generated by the dilution heat of the concentrated sulfuric acid is fully utilized, which is introduced into the crystal transformation tank for maintaining the temperature and heat required for the crystal transformation reaction, thereby achieving the recycling of the dilution heat. According to the actual production, a production line, which has an annual production of 10,000 tons of hemihydrate gypsum, will save about 600,000 Yuan by using the dilution heat from concentrated sulfuric acid.

The present disclosure has the following beneficial effects.

1. Comparing with conventional wet-process phosphoric acid production, the present disclosure can produce an alpha-hemihydrate gypsum product capable of being directly applied to the building materials industry, realizing the industrial continuous large-scale production and resolving the problem that phosphogypsum resulted from the conventional wet-process phosphoric acid production is difficult to be treated.

2. Phosphogypsum, a by-product of the traditional wet-process phosphoric acid production, has a high phosphorus content; in contrast, the alpha-hemihydrate gypsum produced in the present disclosure has a reduced phosphorus content below 0.1%, thereby increasing the availability of phosphorus in the phosphate rock.

3. The morphology of the alpha-hemihydrate gypsum prepared in the present disclosure can be controlled, and the alpha-hemihydrate gypsum having different aspect ratios can be prepared by adjusting the formulation of the crystal transformation agent, which can apply to different market demands.

4. In the present disclosure, full utilization of the vapor generated by the dilution heat of concentrated sulfuric acid allows the recycling of the dilution heat, saving the production cost and energy, reducing the emission.

5. In the present disclosure, all the components of the phosphate rock powder can be used, and no environmental pollutants such as waste water and waste phosphogypsum are discharged.

6. The extraction process of the present disclosure does not require precipitation and layering, greatly reducing the time required for the reaction and aging in the extraction tank, and improving production efficiency.

BRIEF DESCRIPTION OF THE DRAWINGS

The FIGURE is the schematic of technical flow chart of a method for producing wet-process phosphoric acid and at the same time obtaining alpha-hemihydrate gypsum as by-product.

DETAILED DESCRIPTION

For further understanding of the present disclosure, the preferred embodiments of the present disclosure are described below with reference to examples. However, it is to be understood that these descriptions are only for further illustrating the features and advantages of the present disclosure, rather than limiting the claims of the present disclosure.

The chemical reagents used in the examples of the present disclosure are all commercially available, and the concentration of the reagent and the content of the mineral components are both in mass percentage.

EXAMPLES

Example 1

Phosphate rock mining site: Kailin, Guizhou; phosphorus pentoxide content of the phosphate rock: about 32%.

A method for producing wet-process phosphoric acid and at the same time obtaining alpha-hemihydrate gypsum as by-product, comprising the following steps:

(1) phosphate rock powder and diluted sulfuric acid with a mass concentration of 20% were added into an extraction tank according to a solid-liquid mass ratio of 1:4, wherein the fineness of the phosphate rock powder was 100 meshes and the phosphorus pentoxide content in the phosphate rock was 32%; extraction reaction was performed for 30 minutes under stirring to obtain a mixed slurry A, wherein the temperature of the extraction tank was controlled at 80° C.;

(2) solid and liquid in ⅙ volume of the mixed slurry A obtained in step (1) were separated by a filter machine to obtain a supernatant B and a solid C; the supernatant B was transferred to an acid storage as final phosphoric acid and the solid C was transferred to a crystal transformation tank together with the rest mixed slurry;

(3) diluted sulfuric acid with a mass concentration of 20% was added to the crystal transformation tank; the liquid-solid mass ratio of the mixed acid solution after decalcification and slag slurry was controlled at 6:1 to obtain a mixed slurry, wherein the liquid phosphoric acid in terms of $P_2O_5$ was 20% by mass of the mixed acid and the sulfuric acid in terms of $H_2SO_4$ was 9% by mass of the mixed acid; after obtaining the mixed slurry, crystal transformation agents were added: iron sulfate accounted for 0.23% of the mass of the mixed slurry, sodium citrate accounted for 0.12% of the mass of the mixed slurry, and sodium lignosulfonate accounted for 0.08% of the mass of the mixed slurry; crystal transformation reaction was performed for 3 h to obtain a mixed acid slurry D, wherein the temperature of crystal transformation tank was maintained at 110° C.;

(4) solid and liquid in the mixed acid slurry D obtained in step (3) were separated to obtain a solid E and a filtrate F; the solid E was washed with 85° C. hot water to obtain a washing liquid H and a solid G; and the solid G was dried by a blow-dryer at a drying temperature of 110° C. to obtain an alpha-hemihydrate gypsum;

(5) the filtrate F in step (4) was introduced into the extraction tank of step (1) to continue the extraction of phosphate rock powder; the washing liquid H was introduced into a sulfuric acid diluting tank to dilute concentrated sulfuric acid with a mass percentage of 97%, which was used for the extraction process of step (1) and the crystal transformation process of step (3); vapor generated during the dilution process was introduced into the crystal transformation tank to provide heat for reaction.

Detection Results:

Quimociac gravimetric method was used to test the phosphoric acid product and the concentration was 27% wt. The alpha-hemihydrate gypsum product has a $P_2O_5$ content of 0.06 wt %. The alpha-hemihydrate gypsum product conformed to the industry standard JC/T 2038-2010. Under optical microscope of 200× magnification, the alpha-hemihydrate gypsum showed a short hexagonal cylindrical shape, with an aspect ratio of 1 to 2. The alpha-hemihydrate gypsum has a 2 h bending strength of 9.5 MPa, a dry bending strength of 17 MPa, a dry compressive strength of 95 MPa, an initial setting time of 8 min and a final setting time of 17 min.

Example 2

Phosphate rock mining site: Lufa, Guizhou; phosphorus pentoxide content of the phosphate rock: 27%.

A method for producing wet-process phosphoric acid and at the same time obtaining alpha-hemihydrate gypsum as by-product, comprising the following steps:

(1) phosphate rock powder and diluted sulfuric acid with a mass concentration of 30% were added into an extraction tank according to a solid-liquid mass ratio of 1:3, wherein the fineness of the phosphate rock powder was 100 meshes and the phosphorus pentoxide content in the phosphate rock was 27%; extraction reaction was performed for 50 minutes under stirring to obtain a mixed slurry A, wherein the temperature of the extraction tank was controlled at 70° C.;

(2) solid and liquid in ⅔ volume of the mixed slurry A obtained in step (1) were separated by a filter machine to obtain a supernatant B and a solid C; the supernatant B was transferred to an acid storage as final phosphoric acid and the solid C was transferred to a crystal transformation tank together with the rest mixed slurry;

(3) diluted sulfuric acid with a mass concentration of 30% was added to the crystal transformation tank; the liquid-solid mass ratio of the mixed acid solution after decalcification and slag slurry was controlled at 5:1 to obtain a mixed slurry, wherein the liquid phosphoric acid in terms of $P_2O_5$ was 20% by mass of the mixed acid and the sulfuric acid in terms of $H_2SO_4$ was 12% by mass of the mixed acid; after obtaining the mixed slurry, crystal transformation agents were added: aluminum sulfate accounted for 0.25% of the mass of the mixed slurry, sodium citrate accounted for 0.09% of the mass of the mixed slurry, and sodium lignosulfonate accounted for 0.06% of the mass of the mixed slurry; crystal transformation reaction was performed for 2 h to obtain a mixed acid slurry D, wherein the temperature of crystal transformation tank was maintained at 100° C.;

(4) solid and liquid in the mixed acid slurry D obtained in step (3) were separated to obtain a solid E and a filtrate F; the solid E was washed with 90° C. hot water to obtain a washing liquid H and a solid G; and the solid G was dried by a blow-dryer at a drying temperature of 110° C. to obtain an alpha-hemihydrate gypsum;

(5) the filtrate F in step (4) was introduced into the extraction tank of step (1) to continue the extraction of phosphate rock powder; the washing liquid H was introduced into a sulfuric acid diluting tank to dilute concentrated sulfuric acid, which was used for the extraction process of step (1) and the crystal transformation process of step (3); vapor generated during the dilution process was introduced into the crystal transformation tank to provide heat for reaction.

formed to the industry standard JC/T 2038-2010. Under optical microscope of 200× magnification, the alpha-hemihydrate gypsum showed a short hexagonal cylindrical shape, with an aspect ratio of 2 to 3. The alpha-hemihydrate gypsum has a 2 h bending strength of 8.0 MPa, a dry bending strength of 15 MPa, a dry compressive strength of 75 MPa, an initial setting time of 9 min and a final setting time of 18 min.

Example 3

A method for producing wet-process phosphoric acid and at the same time obtaining alpha-hemihydrate gypsum as by-product was carried out in the same manner as described in Example 1, except that the components and contents of the crystal transformation agent used were different, as shown in Table 1:

TABLE 1

Components and contents of crystal transformation agent, as well as performances of the resulting product

| Combination of crystal transformation agent | Components and contents (wt %) | Performances of alpha-hemihydrate gypsum product |
| --- | --- | --- |
| 1 | sodium nitrate 0.10 magnesium sulfate 0.20 sodium dodecyl benzenesulfonate 0.07 | Exhibiting a short hexagonal cylindrical shape with an aspect ratio of 1 to 2 under an optical microscope at 200 X magnification; a 2 h bending strength of 8.0 MPa, a dry bending strength of 16 MPa, a dry compressive strength of 89 MPa, an initial setting time of 8 min and a final setting time of 17 min. |
| 2 | ferric sulfate 0.22 sodium dodecyl benzenesulfonate 0.07 | Exhibiting a short hexagonal cylindrical shape with an aspect ratio of 2 to 4 under an optical microscope at 200 X magnification; a 2 h bending strength of 7.0 MPa, a dry bending strength of 14 MPa, a dry compressive strength of 65 MPa, an initial setting time of 7 min and a final setting time of 17 min. |
| 3 | sodium phosphate 0.10 aluminum sulfate 0.20 aluminum lignosulfonate 0.07 | Exhibiting a short hexagonal cylindrical shape with an aspect ratio of 1 to 2 under an optical microscope at 200 X magnification; a 2 h bending strength of 7.0 MPa, a dry bending strength of 15 MPa, a dry compressive strength of 90 MPa, an initial setting time of 6 min and a final setting time of 19 min. |
| 4 | sodium phosphate 0.12 aluminum lignosulfonate 0.14 | Exhibiting a short hexagonal cylindrical shape with an aspect ratio of 3 to 5 under an optical microscope at 200 X magnification; a 2 h bending strength of 7.0 MPa, a dry bending strength of 14 MPa, a dry compressive strength of 62 MPa, an initial setting time of 6 min and a final setting time of 18 min. |
| 5 | ammonium nitrate 0.11 magnesium sulfate 0.21 sodium chloride 0.08 | Exhibiting a short hexagonal cylindrical shape with an aspect ratio of 1 to 2 under an optical microscope at 200 X magnification; a 2 h bending strength of 8.0 MPa, a dry bending strength of 15 MPa, a dry compressive strength of 93 MPa, an initial setting time of 7 min and a final setting time of 19 min. |
| 6 | ammonium sulfate 0.33 sodium citrate 0.18 | Exhibiting a short hexagonal cylindrical shape with an aspect ratio of 4 to 5 under an optical microscope at 200 X magnification; a 2 h bending strength of 7.0 MPa, a dry bending strength of 13 MPa, a dry compressive strength of 60 MPa, an initial setting time of 8 min and a final setting time of 20 min. |
| 7 | potassium nitrate 0.10 ferric sulfate 0.21 sodium acetate 0.12 | Exhibiting a short hexagonal cylindrical shape with an aspect ratio of 7 to 8 under an optical microscope at 200 X magnification; a 2 h bending strength of 6.0 MPa, a dry bending strength of 10 MPa, a dry compressive strength of 50 MPa, an initial setting time of 3 min and a final setting time of 10 min. |
| 8 | potassium nitrate 0.19 sodium acetate 0.10 | Exhibiting a short hexagonal cylindrical shape with an aspect ratio of 5 to 7 under an optical microscope at 200 X magnification; a 2 h bending strength of 5.0 MPa, a dry bending strength of 9 MPa, a dry compressive strength of 45 MPa, an initial setting time of 4 min and a final setting time of 13 min. |

Detection Results:

Quimociac gravimetric method was used to test the phosphoric acid product and the concentration was 22% wt. The alpha-hemihydrate gypsum product has a $P_2O_5$ content of 0.08 wt %. The alpha-hemihydrate gypsum product con- From the above table, it can be seen that gypsum powder prepared by the present disclosure has an aspect ratio of <10 can be obtained, indicating that the morphology of the alpha-hemihydrate gypsum prepared in the present disclosure can be controlled, and the alpha-hemihydrate gypsum having different aspect ratios can be prepared by adjusting the formulation of the crystal transformation agent, which can apply to different market demands.

Example 4

The amount of vapor (t) generated from per production of 1 ton of alpha-hemihydrate gypsum in the actual production process of examples 1 to 3 was detected and shown in Table 2.

TABLE 2

Results of vapor generated by a vapor recycling process from concentrated sulfuric acid diluting tank in examples 1-3

| Example 1 | Example 2 | Example 3 (Combination 1) | Average value |
|---|---|---|---|
| 0.0436 | 0.0420 | 0.0422 | 0.0426 |

As shown in Table 2, by using the vapor recycling process from sulfuric acid diluting tank, 0.0426 ton of vapor in average is produced per production of 1 ton of alpha-hemihydrate gypsum. An alpha-hemihydrate gypsum production line having an annual output of 100,000 tons can produce a benefit of 639,000 Yuan, as calculated according to the price of 150 Yuan per ton of vapor.

The invention claimed is:

1. A method for producing alpha-hemihydrate gypsum, comprising the following steps:
   (1) mixing phosphate rock powder with diluted sulfuric acid and performing a reaction to obtain a mixed slurry A;
   (2) taking a fraction of X volume of the mixed slurry A obtained in step (1) and performing a solid and liquid separation to obtain a supernatant B and a solid C, wherein $0 < X \leq 2/3$;
   (3) mixing the solid C and a rest fraction of the mixed slurry A with diluted sulfuric acid; adding a crystal transformation agent; performing a crystal transformation process under heating to obtain a mixed slurry D;
   (4) filtering the mixed slurry D obtained in step (3) to obtain an alpha-hemihydrate gypsum.

2. The method for producing alpha-hemihydrate gypsum according to claim 1, wherein in step (1), the solid-liquid mass ratio of the phosphate rock powder to the diluted sulfuric acid is from 1:2 to 1:10.

3. The method for producing alpha-hemihydrate gypsum according to claim 1, wherein in step (1), the temperature of the reaction is from 30 to 95° C. and the duration of the reaction is from 15 to 60 minutes.

4. The method for producing alpha-hemihydrate gypsum according to claim 1, wherein the crystal transformation agent is one selected from water-soluble phosphate, water-soluble sulfate, water-soluble nitrate, water-soluble citrate, water-soluble alkylbenzenesulfonate, water-soluble alkyl fatty acid salt and water-soluble organic carboxylate, or a combination thereof; the water-soluble phosphate, water-soluble sulfate, water-soluble nitrate, water-soluble citrate, water-soluble alkylbenzenesulfonate, water-soluble alkyl fatty acid salt and water-soluble organic carboxylate each independently contain one or more ion(s) of $Al^{3+}$, $Fe^{3+}$, $Mg^{2+}$, $K^+$, $Na^+$ and $NH_4^+$.

5. The method for producing alpha-hemihydrate gypsum according to claim 1, wherein in step (3), the temperature of the crystal transformation process is from 60 to 130° C. and the duration of the crystal transformation process is from 1.5 to 7.5 hours.

6. The method for producing alpha-hemihydrate gypsum according to claim 1, wherein in step (3), the solid-liquid mass ratio of a mixture of solid C and the rest fraction of the mixed slurry A to the diluted sulfuric acid is from 2:1 to 6:1.

7. The method for producing alpha-hemihydrate gypsum according to claim 1, wherein in step (3), in a liquid phase resulting from mixing the solid C and the rest fraction of the mixed slurry A with diluted sulfuric acid, a phosphoric acid named as phosphoric acid II is contained, wherein mass fraction of the phosphoric acid II in terms of $P_2O_5$ is from 16% to 25%, and the mass fraction of sulfuric acid in terms of $H_2SO_4$ is from 8% to 12%.

8. A method for producing wet-process phosphoric acid and at the same time obtaining alpha-hemihydrate gypsum as by-product, comprising the following steps:
   (1) adding phosphate rock powder and diluted sulfuric acid in a solid-liquid mass ratio of 1:2 to 1:10 into a reaction tank; performing a reaction in the reaction tank at a temperature of 30 to 95° C. for 15 to 60 minutes to obtain a mixed slurry A;
   (2) taking a fraction of X volume of the mixed slurry A obtained in step (1) and performing a solid and liquid separation to obtain a supernatant B and a solid C; transferring the supernatant B to an acid storage as a final phosphoric acid and transferring the solid C together with the rest fraction of the mixed slurry A to a crystal transformation tank, wherein $0 < X \leq 2/3$; wherein the final phosphoric acid is the wet-process phosphoric acid, which is named as phosphoric acid I;
   (3) adding diluted sulfuric acid to the crystal transformation tank; controlling liquid-solid ratio as well as content of $P_2O_5$ and $H_2SO_4$ in the crystal transformation tank to obtain a mixed slurry; adding a crystal transformation agent and performing a crystal transformation process for 1.5 to 7.5 hours to obtain a mixed acid slurry D, wherein the temperature of the crystal transformation tank is maintained at 60 to 130° C.;
   (4) separating solid and liquid in the mixed acid slurry D obtained in step (3) to obtain a solid E and a filtrate F; washing the solid E with hot water to obtain a washing liquid H and a solid G; and drying the solid G to obtain an alpha-hemihydrate gypsum;
   (5) introducing the filtrate F in step (4) into the reaction tank of step (1) to continue the reaction of the phosphate rock powder; subjecting the washing liquid H to a dilution process comprising introducing the washing liquid H into a sulfuric acid diluting tank to dilute concentrated sulfuric acid, which is used for the reaction of step (1) and the crystal transformation process of step (3).

9. The method for producing wet-process phosphoric acid and at the same time obtaining alpha-hemihydrate gypsum as by-product according to claim 8, wherein fineness of the phosphate rock powder in step (1) is from 80 to 100 meshes and phosphorus pentoxide content in the phosphate rock powder is from 10 to 40% by mass fraction.

10. The method for producing wet-process phosphoric acid and at the same time obtaining alpha-hemihydrate gypsum as by-product according to claim 8, wherein the mass concentration of diluted sulfuric acid in steps (1) and (3) is from 20 to 40%.

11. The method for producing wet-process phosphoric acid and at the same time obtaining alpha-hemihydrate gypsum as by-product according to claim 8, wherein the mass fraction of sulfate ions in the mixed slurry A in step (1) is less than 1%.

12. The method for producing wet-process phosphoric acid and at the same time obtaining alpha-hemihydrate gypsum as by-product according to claim 8, wherein in step (3), liquid-solid mass ratio of the mixed slurry in the crystal transformation tank is from 2:1 to 6:1, wherein the liquid phosphoric acid in terms of $P_2O_5$ accounts for 16% to 25% by mass fraction of the mixed acid, and the sulfuric acid in terms of $H_2SO_4$ accounts for 8% to 12% by mass fraction of the mixed acid; and the liquid phosphoric acid is phosphoric acid II.

13. The method for producing wet-process phosphoric acid and at the same time obtaining alpha-hemihydrate gypsum as by-product according to claim 8, wherein the crystal transformation agent in step (3) is one selected from a water-soluble phosphate, water-soluble sulfate, water-soluble nitrate, water-soluble citrate, water-soluble alkylbenzenesulfonate, water-soluble alkyl fatty acid salt and water-soluble organic carboxylate, or a combination thereof, which contains one or more ion(s) of $Al^{3+}$, $Fe^{3+}$, $Mg^{2+}$, $K^+$, $Na^+$, $NH_4^+$ ions.

14. The method for producing wet-process phosphoric acid and at the same time obtaining alpha-hemihydrate gypsum as by-product according to claim 13, wherein the crystal transformation agent added in step (3) is a combination of sodium citrate, ferric sulfate and sodium lignosulfonate; or a combination of sodium nitrate, magnesium sulfate and sodium dodecyl sulfonate; or a combination of sodium phosphate, aluminum sulfate and sodium lignosulfonate; or a combination of ammonium nitrate, magnesium sulfate and sodium chloride;

wherein the total amount of the crystal transformation agent added in step (3) is from 0.1% to 1.0% by mass of the mixed slurry; wherein the combination of the crystal transformation agent is one of the following combinations by mass ratio:
a. sodium citrate:ferric sulfate:sodium lignosulfonate=1.00:1.50~2.00:0.30~0.90;
b. sodium nitrate:magnesium sulfate:sodium dodecyl sulfonate=1.00:1.50~2.00:0.30~0.90;
c. sodium phosphate:aluminum sulfate:sodium lignosulfonate=1.00:1.50~2.00:0.40~0.90;
d. ammonium nitrate:magnesium sulfate:sodium chloride=1.00:1.6~02.20:0.50~0.80.

15. The method for producing wet-process phosphoric acid and at the same time obtaining alpha-hemihydrate gypsum as by-product according to claim 8, wherein the temperature of the hot water in step (4) is from 80 to 90° C.; wherein the drying temperature in step (4) is from 110 to 180° C.

16. The method for producing wet-process phosphoric acid and at the same time obtaining alpha-hemihydrate gypsum as by-product according to claim 8, wherein vapor generated in the dilution process in step (5) is introduced into the crystal transformation tank in step (3) to provide heat for the crystal transformation process.

17. A method for producing wet-process phosphoric acid and at the same time obtaining alpha-hemihydrate gypsum as by-product, comprising the following steps:
(1) adding phosphate rock powder and diluted sulfuric acid with a mass concentration of 20% into a reaction tank according to a solid-liquid mass ratio of 1:4, wherein fineness of the phosphate rock powder is 100-mesh and phosphorus pentoxide content in the phosphate rock is 32%; performing a reaction in the reaction tank at a temperature of 80° C. for 30 minutes under stirring to obtain a mixed slurry A;
(2) taking a fraction of ⅙ volume of the mixed slurry A obtained in step (1) and performing a solid and liquid separation to obtain a supernatant B and a solid C; transferring the supernatant B to an acid storage as a final phosphoric acid and transferring the solid C together with the rest fraction of the mixed slurry A to a crystal transformation tank;
(3) adding diluted sulfuric acid with a mass concentration of 20% to the crystal transformation tank; controlling liquid-solid mass ratio of mixed acid solution and slag slurry in the crystal transformation tank at 6:1 to obtain a mixed slurry, wherein a liquid phosphoric acid in terms of $P_2O_5$ is 20% by mass fraction of the mixed acid and the sulfuric acid in terms of $H_2SO_4$ is 9% by mass fraction of the mixed acid; then, adding crystal transformation agents: 0.23% of iron sulfate based on the mass of the mixed slurry, 0.12% of sodium citrate based on the mass of the mixed slurry, and 0.08% of sodium lignosulfonate based on the mass of the mixed slurry; performing a crystal transformation process in a crystal transformation tank at a temperature of 110° C. for 3 h to obtain a mixed acid slurry D; wherein the liquid phosphoric acid is phosphoric acid II;
(4) separating solid and liquid in the mixed acid slurry D obtained in step (3) to obtain a solid E and a filtrate F; washing the solid E with 85° C. hot water to obtain a washing liquid H and a solid G; and drying the solid G with a blow-dryer at a drying temperature of 110° C. to obtain an alpha-hemihydrate gypsum;
(5) introducing the filtrate F in step (4) into the reaction tank of step (1) to continue the reaction of phosphate rock powder; introducing the washing liquid H into a sulfuric acid diluting tank to dilute concentrated sulfuric acid, which is used for the reaction of step (1) and the crystal transformation process of step (3); introducing vapor generated during the dilution process into the crystal transformation tank to provide heat for reaction, wherein the final phosphoric acid is the wet-process phosphoric acid, which is named as phosphoric acid I.

18. The method for producing wet-process phosphoric acid and at the same time obtaining alpha-hemihydrate gypsum as by-product according to claim 10, wherein the mass concentration of diluted sulfuric acid in steps (1) and (3) is from 20 to 35%.

19. The method for producing wet-process phosphoric acid and at the same time obtaining alpha-hemihydrate gypsum as by-product according to claim 12, wherein in step (3), liquid-solid mass ratio of mixed acid solution and the mixed slurry in the crystal transformation tank is from 3:1 to 5:1, wherein the liquid phosphoric acid in terms of $P_2O_5$ accounts for 18% to 23% by mass fraction of the mixed acid, and the sulfuric acid in terms of $H_2SO_4$ accounts for 9% to 10% by mass fraction of the mixed acid; and the liquid phosphoric acid is phosphoric acid II.

20. The method for producing wet-process phosphoric acid and at the same time obtaining alpha-hemihydrate gypsum as by-product according to claim 15, wherein the drying temperature in step (4) is from 110 to 130° C.

* * * * *